(12) United States Patent
Kuraki et al.

(10) Patent No.: US 8,861,781 B2
(45) Date of Patent: Oct. 14, 2014

(54) DIGITAL WATERMARK EMBEDDING APPARATUS AND METHOD

(75) Inventors: Kensuke Kuraki, Ichikawa (JP); Shohei Nakagata, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 13/476,137

(22) Filed: May 21, 2012

(65) Prior Publication Data

US 2013/0028465 A1 Jan. 31, 2013

(30) Foreign Application Priority Data

Jul. 28, 2011 (JP) ................................. 2011-165535

(51) Int. Cl.
G06T 1/00 (2006.01)
(52) U.S. Cl.
CPC ....... *G06T 1/0085* (2013.01); *G06T 2201/0051* (2013.01)
USPC .......................................................... 382/100
(58) Field of Classification Search
None
See application file for complete search history.

(56) References Cited

U.S. PATENT DOCUMENTS

| 7,769,197 | B2 | 8/2010 | Fujii et al. | |
|---|---|---|---|---|
| 8,385,590 | B1 * | 2/2013 | Moorer | 382/100 |
| 2005/0094847 | A1 * | 5/2005 | Venkatesan et al. | 382/100 |
| 2006/0072780 | A1 * | 4/2006 | Zarrabizadeh | 382/100 |
| 2008/0304702 | A1 * | 12/2008 | Van Leest | 382/100 |
| 2009/0074242 | A1 | 3/2009 | Yamamoto et al. | |
| 2010/0100971 | A1 | 4/2010 | Geyzel et al. | |
| 2012/0070032 | A1 | 3/2012 | Yamamoto et al. | |

FOREIGN PATENT DOCUMENTS

| EP | 1253555 A2 | 10/2002 |
|---|---|---|
| EP | 1720354 A1 | 11/2006 |
| WO | WO 2005/079072 A1 | 8/2005 |
| WO | WO 2007/072442 A2 | 6/2007 |
| WO | WO 2007/102403 A1 | 9/2007 |
| WO | WO-2010-062290 A1 | 6/2010 |

OTHER PUBLICATIONS

Agung et al. "Video Scene Characteristic Detection to Improve Digital Watermarking Transparency." IEE Proceedings, Vision, Image and Signal Processing, vol. 151, issue 2, Apr. 30, 2004, pp. 146-152.*
Koz et al. "Oblivious Spatio-Temporal Watermarking of Digital Video by Exploiting the Human Visual System." IEEE Transactions on Circuits and Systems for Video Technology, vol. 18, No. 3, Mar. 2008, p. 326-337.*
Extended European Search Report dated Nov. 29, 2012 corresponding to European Application No. 12169249.5.

* cited by examiner

*Primary Examiner* — Jon Chang
(74) *Attorney, Agent, or Firm* — Fujitsu Patent Center

(57) ABSTRACT

An apparatus includes: a generator which generates a first pattern including a plurality of pixels having a first value, with an area of the first pattern changing in a constant cycle, and, a phase of cyclical change of the area changing based on a value of a symbol included in an inputted digital watermark information; a generator which generates a second pattern including a plurality of pixels having a second value, with an area of the second pattern changing with a frequency characteristic that is different from the cycle of change of the area; and a unit which superimposes the first and the second pattern into each image area of images in time series constituting an inputted video image to correct a value of each pixel in an image area to which the first or the second pattern is superimposed according to the first and the second value.

15 Claims, 18 Drawing Sheets

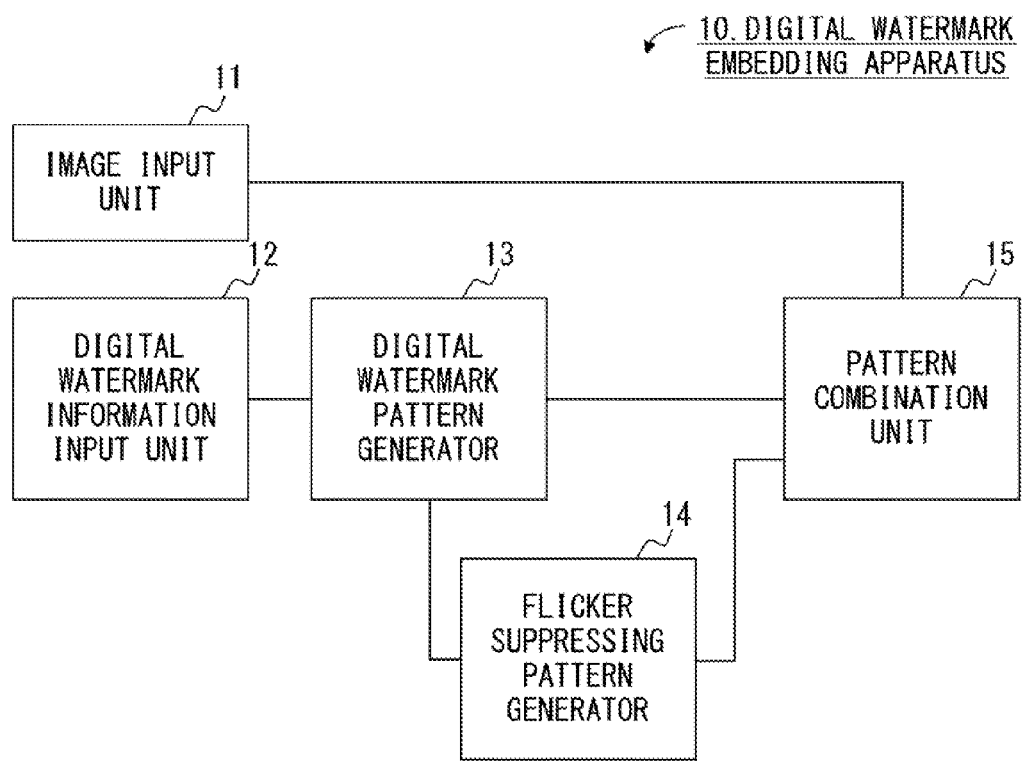
F I G. 1

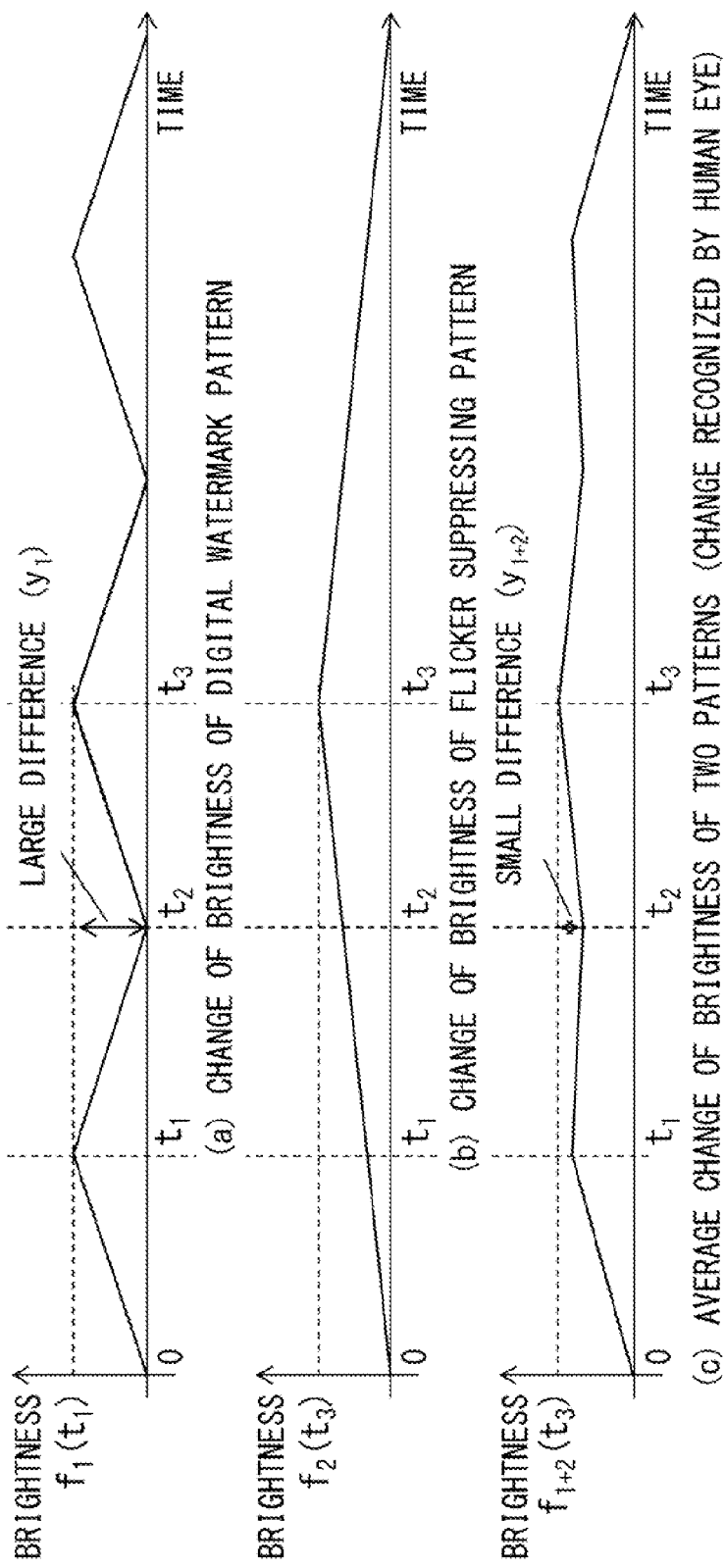
F I G. 6 A

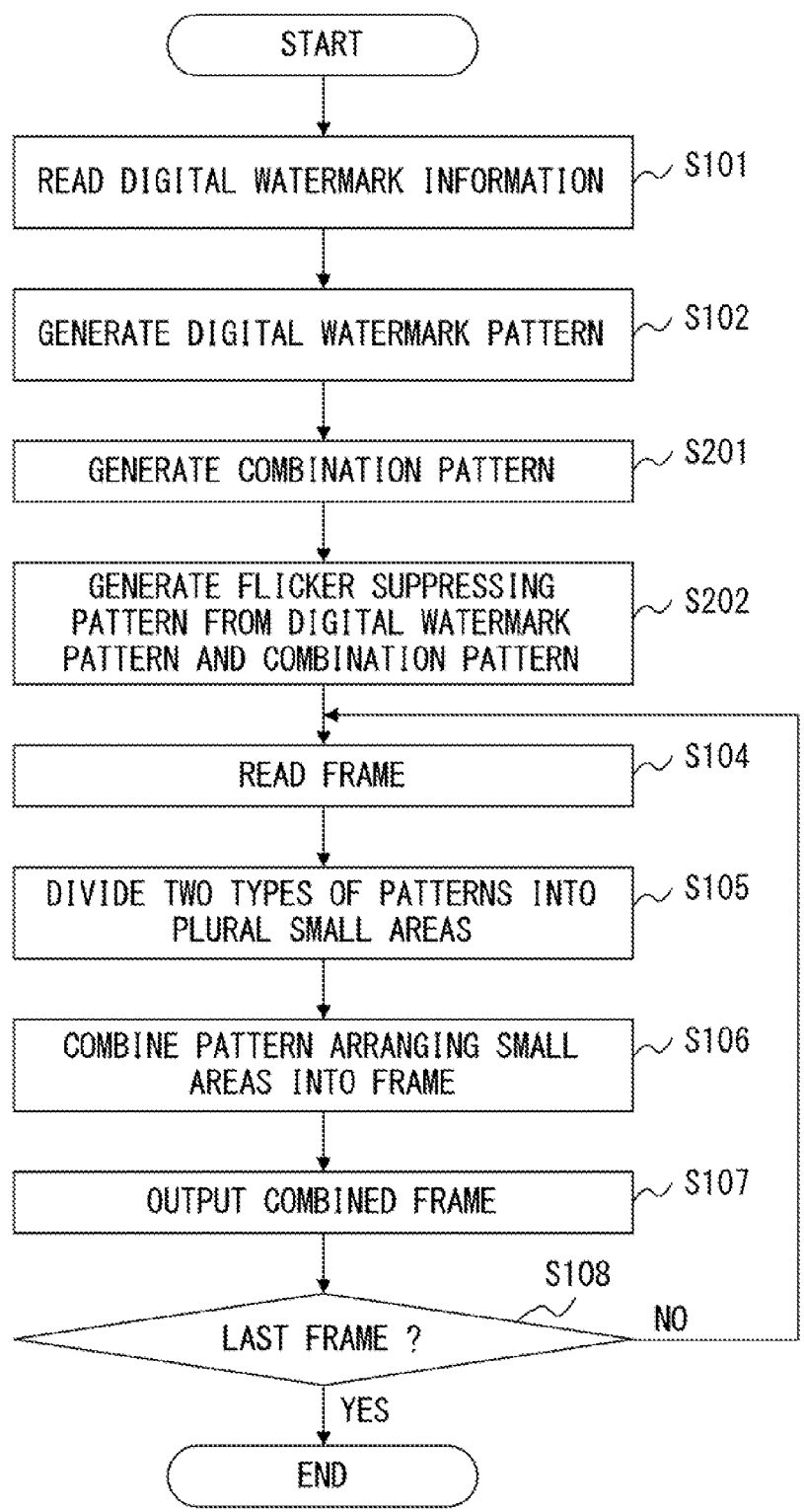
F I G. 1 2

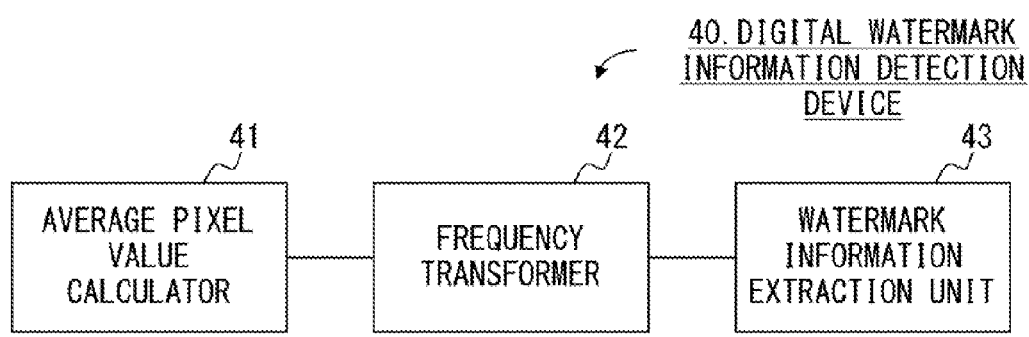
F I G. 1 4

DIGITAL WATERMARK EMBEDDING APPARATUS AND METHOD

CROSS-REFERENCE TO RELATED APPLICATION

This application is based upon and claims the benefit of priority of the prior Japanese Patent Application No. 2011-165535, filed on Jul. 28, 2011, the entire contents of which are incorporated herein by reference.

FIELD

The embodiments discussed herein are related to a digital watermark technique to embed additional information such as copyright information and user information into image data and voice data.

BACKGROUND

The digital watermark technique is a technique to embed additional information into image data and voice data in away in which people do not recognize it. For example, when copyright information of content or purchase information of a user is embedded as a digital watermark, when the content is fraudulently leaked, it may be used for identifying the presence/absence of copyright information and the source of the leaking.

In addition, the digital watermark technique may also be applied to advertisement, other than the protection of content. For example, a video image to which information related to an item or a person featured in the video image (for example, Uniform Resource Locator (URL) information specifying the location where the information resource exists on the Internet) is distributed to a television set, a PC and the like. When the video image is displayed on the television set or the display device of the PC, the viewer captures the displayed image by a mobile terminal with a camera and the like, and detects the URL from the image using a dedicated application. Then, by operating the mobile terminal and accessing the Website at the location specified by the URL, it becomes possible for the viewer to instantly buy the item feature in the image, or to instantly obtain information of other works in which the person in the video image appears.

When a content to which such a digital watermark is embedded is subjected to a filter process, camera capturing and the like, the embedded digital watermark may be lost. For this reason, the digital watermark is required to be resistant to possible causes for the loss. However, enhancement of the intensity to embed the digital watermark in order to add such resistance causes image quality degradation as the original content is subjects to a greater change.

In relation to the technique to embed a digital watermark information into video data, a technique in which the brightness of each frame is changed cyclically based on digital watermark information has been known. In this technique, the light and dark of each frame changes in the time direction. This generates a difference in the brightness between the brightest frame and the darkest frame, which may be recognized as a flicker on the screen.

In addition, in relation to the digital watermark technique, a technique in which each frame of a video image is divided into a plurality of blocks, and information is embedded by combining signals of opposite phases into adjacent blocks.

In addition, a technique in which an N−1 dimension pattern is generated based on an embedding system generated based on embedding information, and an N dimension embedding pattern generated by modulating a periodic signal based on a value on the N−1 dimension pattern is superimposed into an input signal and output.

Meanwhile, techniques described in the following documents have been known.

Document 1: International Publication Pamphlet No. 2005/079072
Document 2: International Publication Pamphlet No. 2007/102403

SUMMARY

According to an aspect of the embodiment, a digital watermark embedding apparatus includes: an image input unit which obtains input of images in time series constituting a video image; a digital watermark information input unit which obtains input of digital watermark information; a digital watermark pattern generator which generates a digital watermark pattern including a plurality of pixels having a predetermined first value, with an area of the digital watermark pattern changing in a constant cycle, and, a phase of cyclical change of the area changing based on a value of a symbol included in the digital watermark information; a flicker suppressing pattern generator which generates a flicker suppressing pattern including a plurality of pixels having a predetermined second value, with an area of the flicker suppressing pattern changing with a frequency characteristic that is different from the cycle of change of the area; and a pattern combination unit which superimposes the digital watermark pattern and the flicker suppressing pattern into each image area of the images in time series to correct a value of each pixel in an image area to which the digital watermark pattern or the flicker suppressing pattern is superimposed according to the first value and the second value.

According to another aspect of the embodiment, a digital watermark embedding method includes: generating a digital watermark pattern including a plurality of pixels having a predetermined first value, with an area of the digital watermark pattern changing in a constant cycle, and, a phase of cyclical change of the area changing based on a value of a symbol included in digital watermark information; generating a flicker suppressing pattern including a plurality of pixels having a predetermined second value, with an area of the flicker suppressing pattern changing with a frequency characteristic that is different from the cycle of change of the area; and superimposing the digital watermark pattern and the flicker suppressing pattern into each image area of images in time series constituting a video image to correct a value of each pixel in an image area to which the digital watermark pattern or the flicker suppressing pattern is superimposed according to the first value and the second value.

According to yet another aspect of the embodiment, a computer readable non-transitory recording medium stores a program to make a computer perform embedding of a digital watermark, wherein the program includes: generating a digital watermark pattern including a plurality of pixels having a predetermined first value, with an area of the digital watermark pattern changing in a constant cycle, and, a phase of cyclical change of the area changing based on a value of a symbol included in digital watermark information; generating a flicker suppressing pattern including a plurality of pixels having a predetermined second value, with an area of the flicker suppressing pattern changing with a frequency characteristic that is different from the cycle of change of the area; and superimposing the digital watermark pattern and the flicker suppressing pattern into each image area of images in time series constituting a video image to correct a value of each pixel in an image area to which the digital watermark pattern or the flicker suppressing pattern is superimposed according to the first value and the second value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a functional block diagram of a digital watermark embedding apparatus.

FIG. 6A is a diagram (part 2) explaining a flicker suppressing pattern.

FIG. 12 is a flowchart illustrating a second example of a digital watermark embedding process.

FIG. 14 is a functional block diagram of a digital watermark information detection apparatus.

DESCRIPTION OF EMBODIMENTS

Figure 2:
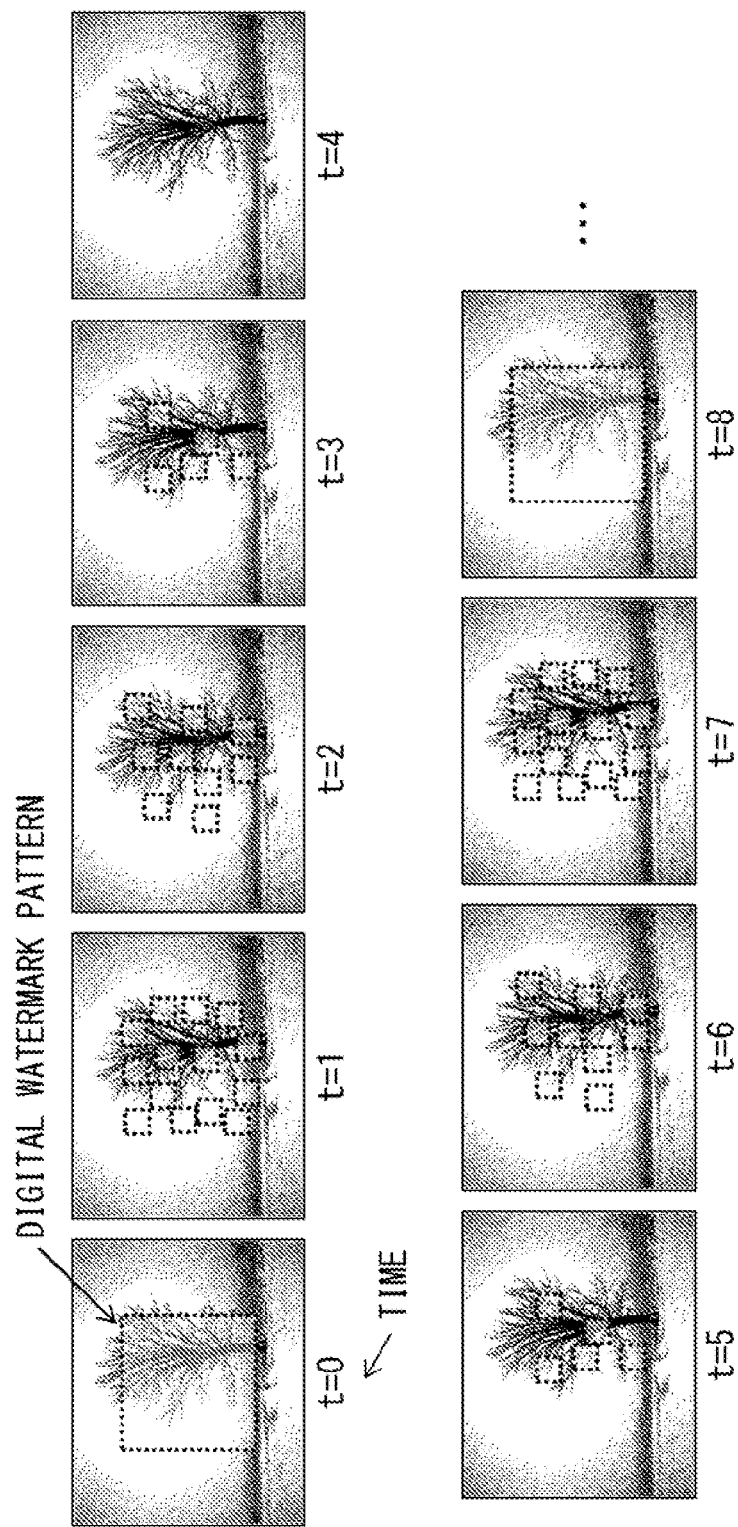
FIG. 2 is an example of a digital watermark pattern.

Preferred embodiments of the present invention will be explained with reference to accompanying drawings.

FIG. 1 is explained first. FIG. 1 is a functional block diagram of a digital watermark embedding apparatus.

The digital watermark embedding apparatus 10 has an image input unit 11, a digital watermark information input unit 12, a digital watermark pattern generator 13, a flicker suppressing pattern generator 14, and a pattern combination unit 15.

The image input unit 11 obtains images in time series constituting a video image, transmitted from another device to the digital watermark embedding apparatus 10.

The digital watermark information input unit 12 obtains information (digital watermark information) to be embedded into a video image as a digital watermark, input to the digital watermark embedding apparatus 10.

The digital watermark pattern generator 13 generates a digital watermark pattern that includes a plurality of pixels having a predetermined first value and whose area changes in a constant cycle, and, in which the phase in the cyclical change of the area is changed based on the value of the symbol included in the digital watermark information.

The flicker suppressing pattern generator 14 generates a flicker suppressing pattern that includes a plurality of pixels having a predetermined second value, and whose area changes with a different frequency characteristic than the cycle of the change of the area of the digital watermark pattern generated by the digital watermark pattern generator 13.

The pattern combination unit 15 first superimposes the generated digital watermark pattern into each image area of the images in time series obtained by the image input unit 11, and also superimposes the generated flicker suppressing pattern. Then, the value of each pixel in the image area into which the digital watermark pattern or the flicker suppressing pattern is superimposed is modified based on the first value and the second value mentioned above.

Some of the functional blocks mentioned above are explained in greater detail.

First, the digital watermark pattern generator 13 is explained.

The digital watermark pattern generator 13 generates a pattern (digital watermark pattern) that includes a plurality of pixels having a predetermined first value, and cyclically changes in the time direction.

Here, FIG. 2 is explained. FIG. 2 is an example of a digital watermark pattern generated by a digital watermark pattern generator 13.

Each of the images arranged in time series in FIG. 2 represents the digital watermark pattern at each time t=0 through t=8, and represent the way the area of the digital watermark pattern changes as the time passes. In FIG. 2, the area of the digital watermark pattern is largest at t=0, and assuming the area at this time as 100%, the area gradually decreases from t=1 to 4, and the area becomes smallest (0%) at t=4. After that, the change of the area turns to increase, with the area gradually increasing from t=5 to 8, and the area returns to 100% at t=8. The digital watermark pattern generator 13 generates digital watermark pattern whose area changes in a constant cycle, as described above.

When the area of the digital watermark pattern is changed as described above, the brightness of the entire image changed accordingly. Next, the relationship between the change of the area of the digital watermark pattern and the change in the brightness is explained using FIG. 3.

Figure 3:
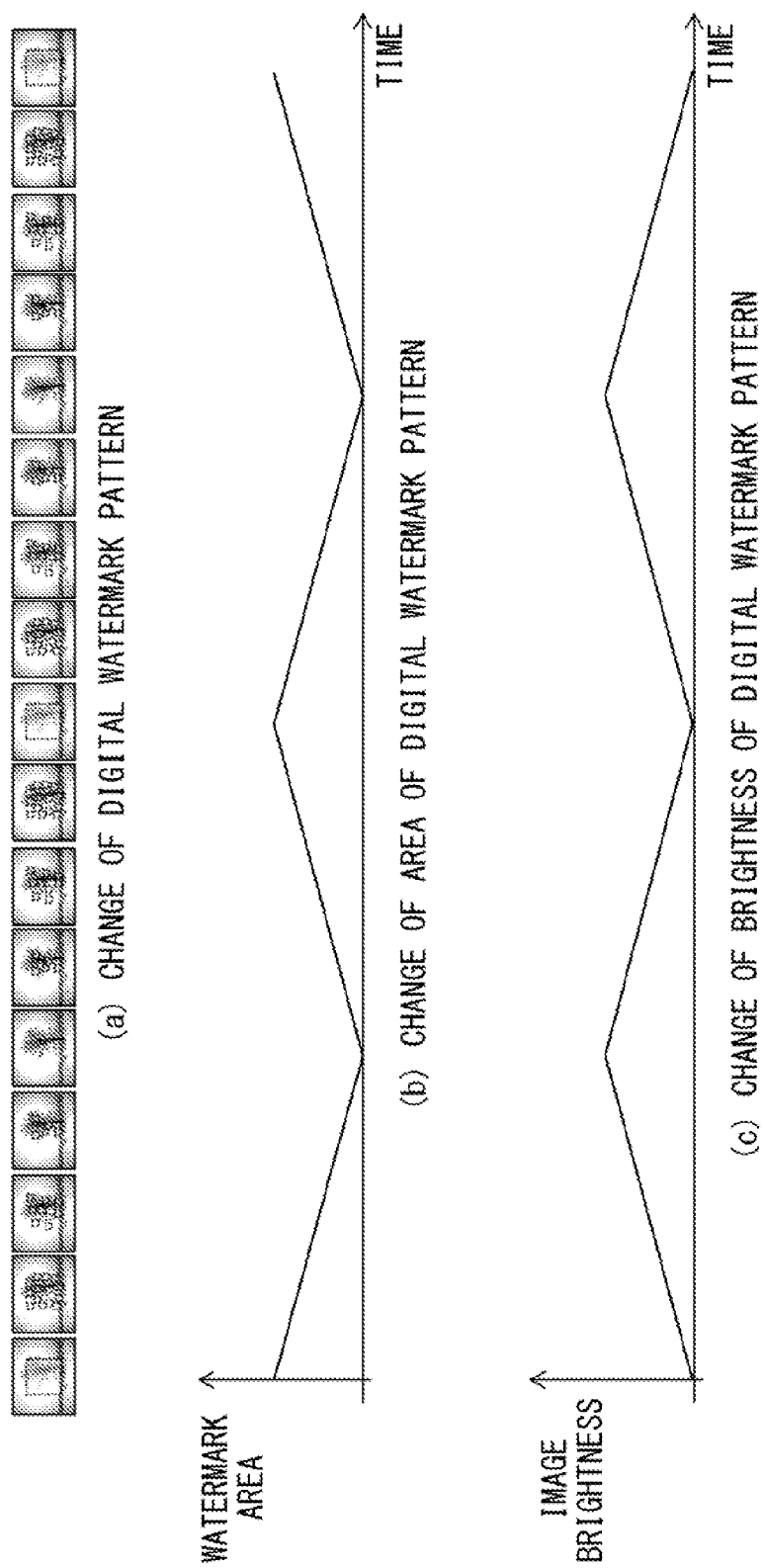
FIG. 3 is a diagram explaining the relationship between the change of the area and the change of the brightness of the image in a digital watermark pattern.

In FIG. 3, (a) represents the way the digital watermark pattern changes as the time passes, which represents a similar change to that in FIG. 2.

Meanwhile, the graph in (b) represents the relationship between the time and the area of the digital watermark pattern in the change in the digital watermark pattern illustrated in (a). The vertical axis of the graph represents the area of the digital watermark pattern, and the horizontal axis represents the time. From this graph, it can be understood that the area of the digital watermark pattern changes in a certain circle in the time direction.

Further, the graph in (c) represents the relationship between the time and the brightness of the digital watermark pattern in the change in the digital watermark pattern illustrated in (a). The vertical axis of the graph represents the brightness of the image area, and the horizontal axis represents the time. Meanwhile, here, it is assumed a case in which the pixels constituting the digital watermark pattern are darker than the image area to which the digital watermark pattern is superimposed. Therefore, the brightness of the digital watermark becomes darker as its area is larger, and becomes brighter as its area is smaller. Thus, when the change of the brightness of the digital watermark pattern is cyclical and the range of the change (the difference between the highest value and the lowest value of the brightness) is large, flickers in the image to which the digital watermark pattern is superimposed become noticeable. In this embodiment, the degradation of the image quality due to the flicker is alleviated by further superimposing the flicker suppressing pattern described later.

Figure 4A:
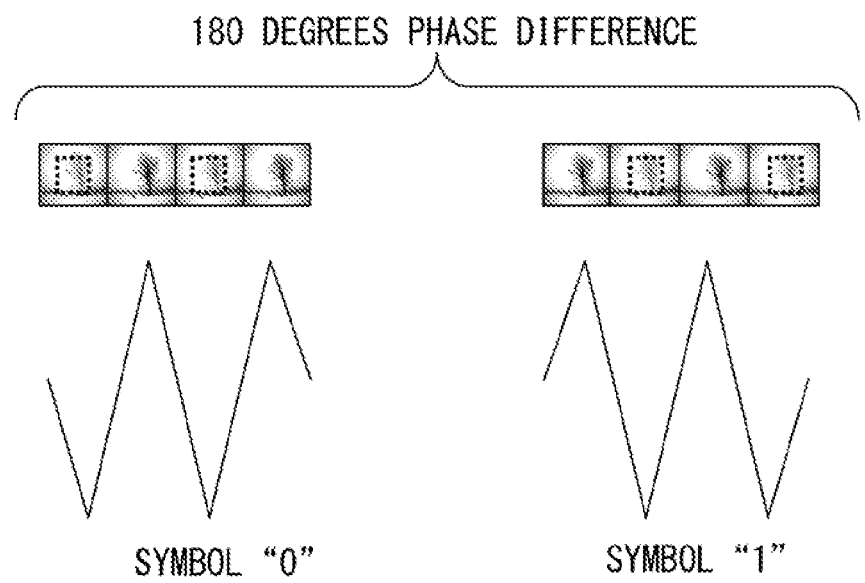
FIG. 4A is a diagram (part 1) explaining a method to express digital watermark information by a digital watermark pattern.
Figure 4B:
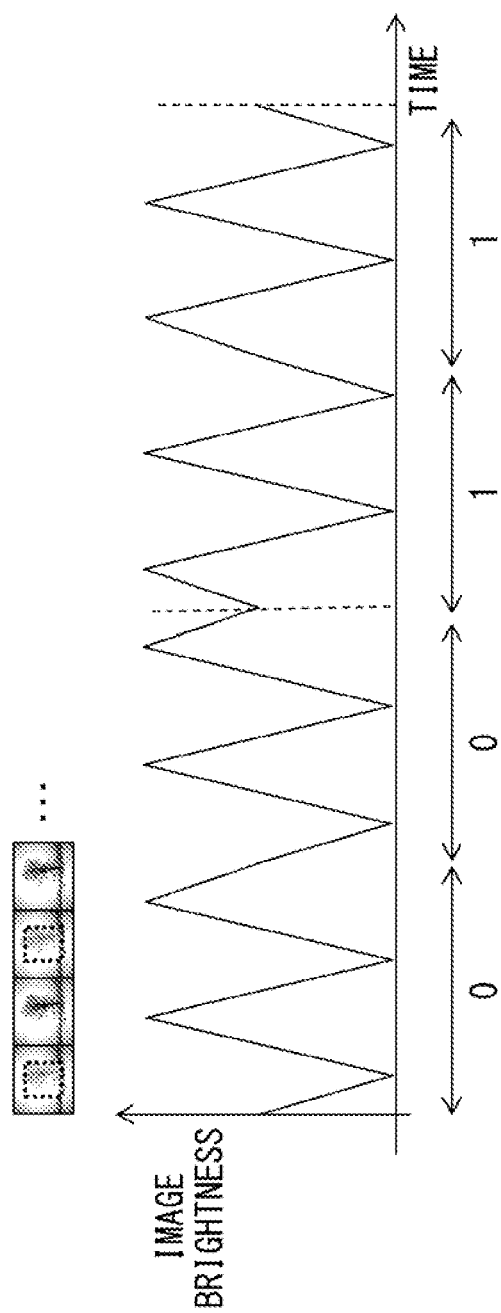
FIG. 4B is a diagram (part 2) explaining a method to express digital watermark information by a digital watermark pattern.

Next, a method in which the digital watermark pattern generator 13 expresses the digital watermark information obtained by the digital watermark information input unit 12 with the digital watermark pattern is explained using FIG. 4A and FIG. 4B.

FIG. 4A represents binary symbols "0", "1" and the way the image corresponding to each of the symbols changes.

In this embodiment, when representing the symbol "0", the digital watermark pattern generator 13 makes the area of the digital watermark pattern change gradually as 50%→100%→0%→100%→0%→50%. Therefore, the brightness of the image to which the digital watermark pattern is superimposed changes gradually as dark→bright→dark→bright. On the other hand, when representing the symbol "1", the digital watermark pattern generator 13 reverses the phase of the change of the area of the digital watermark pattern with respect to the phase of the change in the case of representing the symbol "0", and makes it change gradually as 50%→0%→100%→0%→100%→50% in this case. Therefore, the brightness of the image to which the digital watermark pattern is superimposed changes gradually as bright→dark→bright→dark.

Thus, the digital watermark pattern generator 13 expresses the digital watermark information by reversing the phase of the change of the area of the digital watermark pattern, based on the symbol of each bit in the digital watermark information that is expressed as data in a bit string.

FIG. 4B represents the change of the brightness of the image to which a digital watermark pattern whose digital watermark information expresses 4-bit data "0011", as a graph.

Meanwhile, in this graph, the vertical axis represents the brightness of the image, and the horizontal axis represents the time.

In this case, in the 4-bit data "0011", the symbol of the first and second bits is "0", and the symbol of the third and fourth data is "1". That is, since the symbol changes from "0" to "1" at the third bit in this data, the digital pattern generator 13 reverses the phase of the change of the area of the digital watermark pattern at this time.

The digital watermark pattern generator 13 expresses the watermark information by the digital watermark pattern.

Next, the generation of the flicker suppressing pattern performed by the flicker suppressing pattern generator 14 is explained.

The flicker suppressing pattern is a pattern that includes a plurality of pixels having a predetermined value (in this embodiment, it is supposed to be the same value as the pixels included in the digital watermark pattern), and whose area changes with a different frequency characteristic than the cycle of the change of the area of the digital watermark pattern. The flicker suppressing pattern is explained using FIG. 5.

Figure 5:
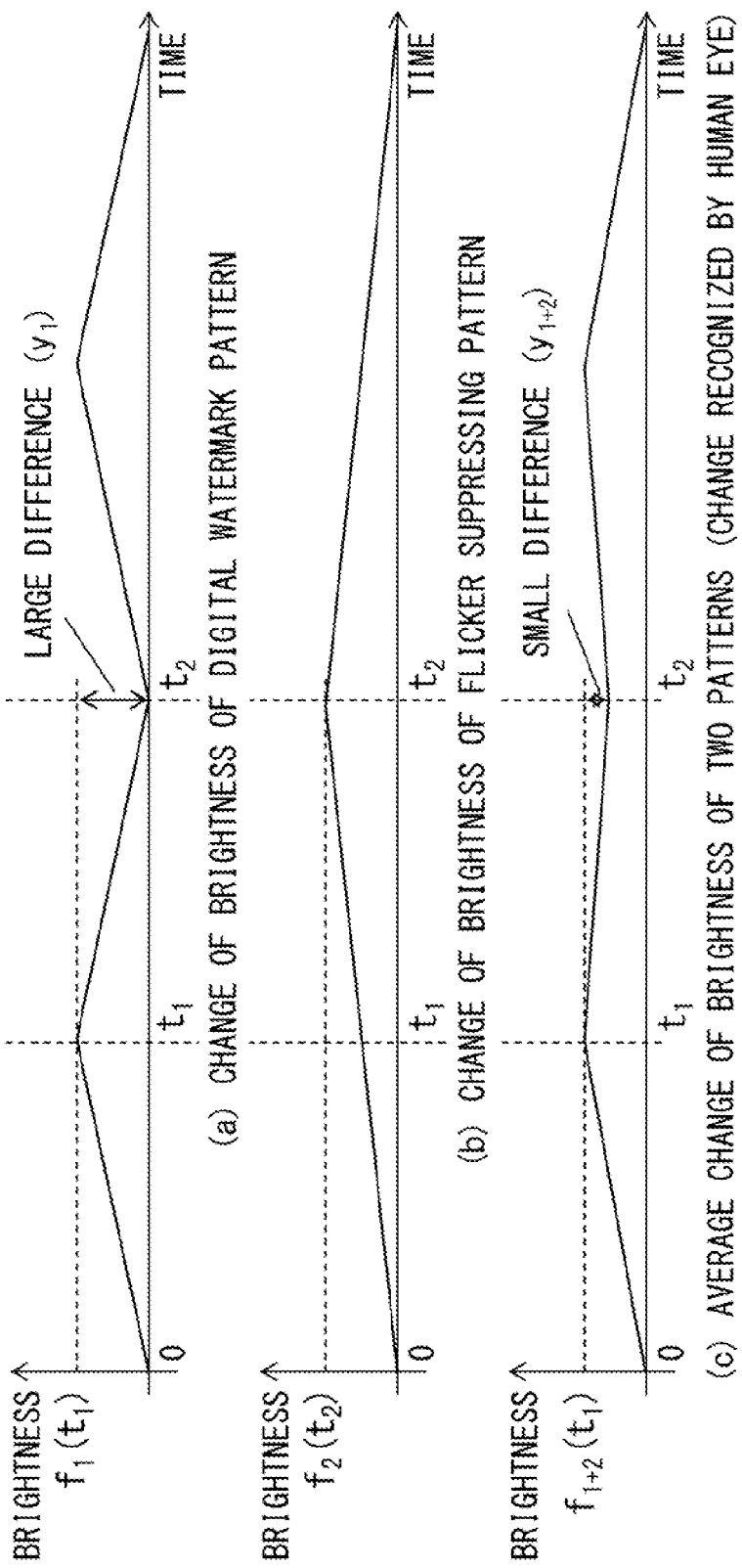
FIG. 5 is a diagram (part 1) explaining a flicker suppressing pattern.

In each graph illustrated in FIG. 5, the vertical axis represents the brightness, and the horizontal axis represents the time.

In FIG. 5, the graph (a) represents the change of the brightness of the digital watermark pattern, and is the same graph as the graph (c) in FIG. 3. The function represented by the graph is expressed as $f_1(t)$. In addition, the time at which the brightness of the digital watermark pattern becomes largest is assumed as $t_1$, and the time at which the brightness becomes smallest is assumed as $t_2$. As described earlier, when the brightness changes cyclically and its variation width $y_1$ ($=f_1(t_1)-f_1(t_2)$) is large, flickers become noticeable in the image to which the digital watermark pattern is superimposed and combined.

The graph (b) represents the change of the brightness of the flicker suppressing pattern. Meanwhile, the graph is an example of a case in which the flicker suppressing pattern generator 14 generates a pattern whose area changes in a constant cycle that is different from the cycle of the change of the area of the digital watermark pattern (here, twice the cycle). The function expressed by the graph is represented as $f_2(t)$. Meanwhile, in this example, it is assumed that the brightness of the flicker suppressing pattern takes the largest value $f_2(t_2)$ at the time $t_2$ mentioned above.

Then, the graph (c) is an average of the brightness represented in the respective graphs (a) and (b). To human vision, the brightness of the pattern in which the digital watermark pattern and the flicker suppressing pattern are superimposed and combined is recognized as the average brightness of the brightness of each of them.

The function $f_{1+2}(t)$ is as the following expression.

$$f_{1+2}(t) = \{f_1(t) + f_2(t)\}/2$$

Therefore, the difference y1+2 in the brightness at the time t1 and the time t2 is calculated by the calculation in the following expression.

$$y_{1+2} = f_{1+2}(t_1) - f_{1+2}(t_2)$$
$$= [\{f_1(t_1) + f_2(t_1)\} - \{f_1(t_2) + f_2(t_2)\}]/2$$

Here, assuming that the amplitude of the graph (a) and the graph (b) is the same ($f_1(t_1) = f_2(t_2) = y_1$), and assuming $f_2(t_1) = 0.5 * f_1(t_1)$ and $f_1(t_2) = 0$, the difference $y_{1+2}$ in the brightness is as the following expression.

$$y_{1+2} = \{(y_1 + 0.5y_1) - (0 + y_1)\}/2 = 0.25y_1$$

That is, in this case, by superimposing the flicker suppressing pattern together with the digital watermark pattern into the image, the difference in light and dark at the time $t_1$ and the time $t_2$ becomes smaller to ¼(=25%), and flickers become less noticeable.

Figure 6B:
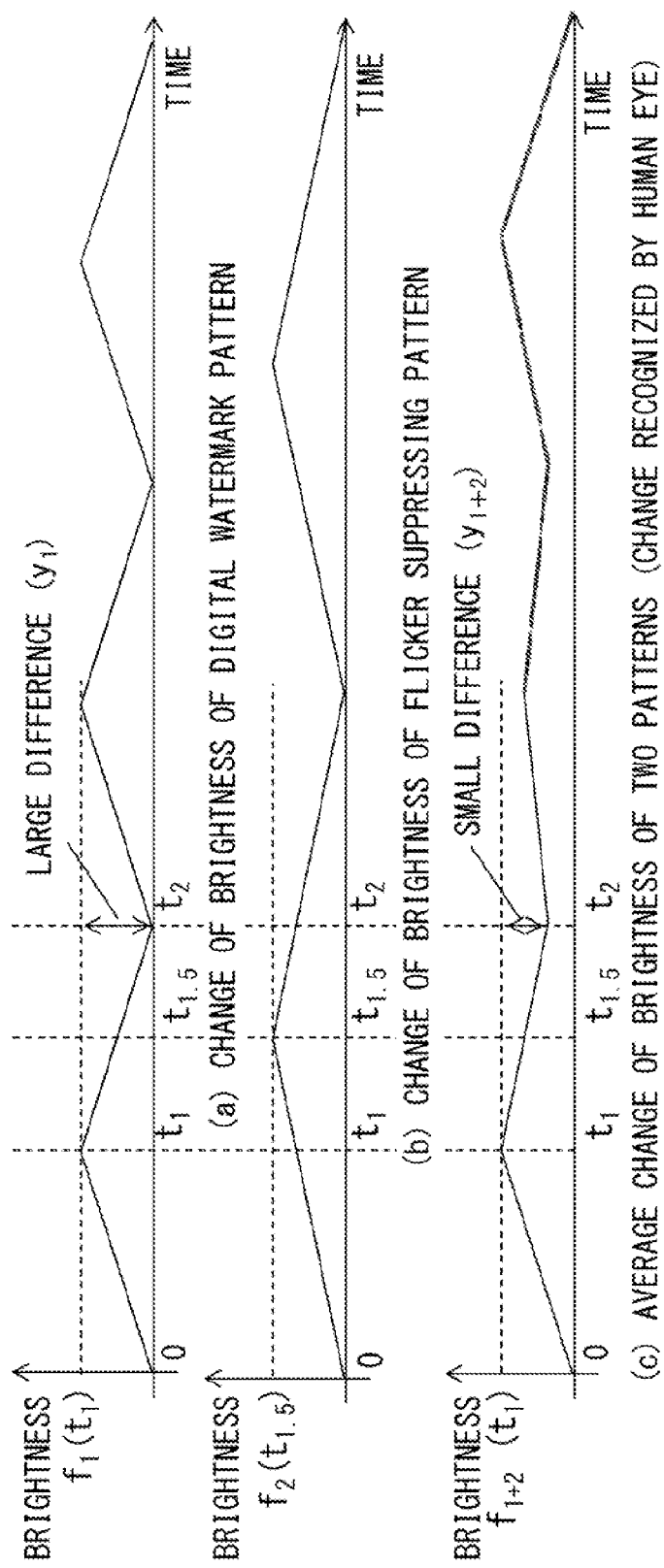
FIG. 6B is a diagram (part 3) explaining a flicker suppressing pattern.

Meanwhile, the cycle of the change of the area of the flicker suppressing pattern may not be 2 times the cycle in the case of the example in FIG. 5, that is, the cycle of the change of the area of the digital watermark pattern. FIG. 6A is a similar graph to FIG. 5, in a case in which the cycle of the change of the area of the flicker suppressing pattern is three times the cycle of the change of the area of the digital watermark pattern. Meanwhile, FIG. 6B is a similar graph to FIG. 5, in a case in which the cycle of the change of the area of the flicker suppressing pattern is 1.5 times the cycle of the change of the area of the digital watermark pattern. As is understood from both FIG. 6A and FIG. 6B, while the positions of the peak/dip of the graphs are different, it is understood that the difference $y_{1+2}$ in light and dark in the graph (c) is smaller than the difference y1 in light and dark in the graph (a). With the reduced difference in light and dark as described above, an effect to suppress flickers may be obtained.

Next, the superimposing combination of the digital watermark pattern and the flicker suppressing pattern into an image performed by the pattern combination unit 15 is explained with reference to FIG. 7.

The pattern combination unit 15 divides each of the digital watermark pattern and the flicker suppressing pattern into a plurality of small areas, and performs combining in which patterns obtained by arranging the obtained small areas into each of images in time series. FIG. 7 represents the process of the combining schematically.

Figure 7:
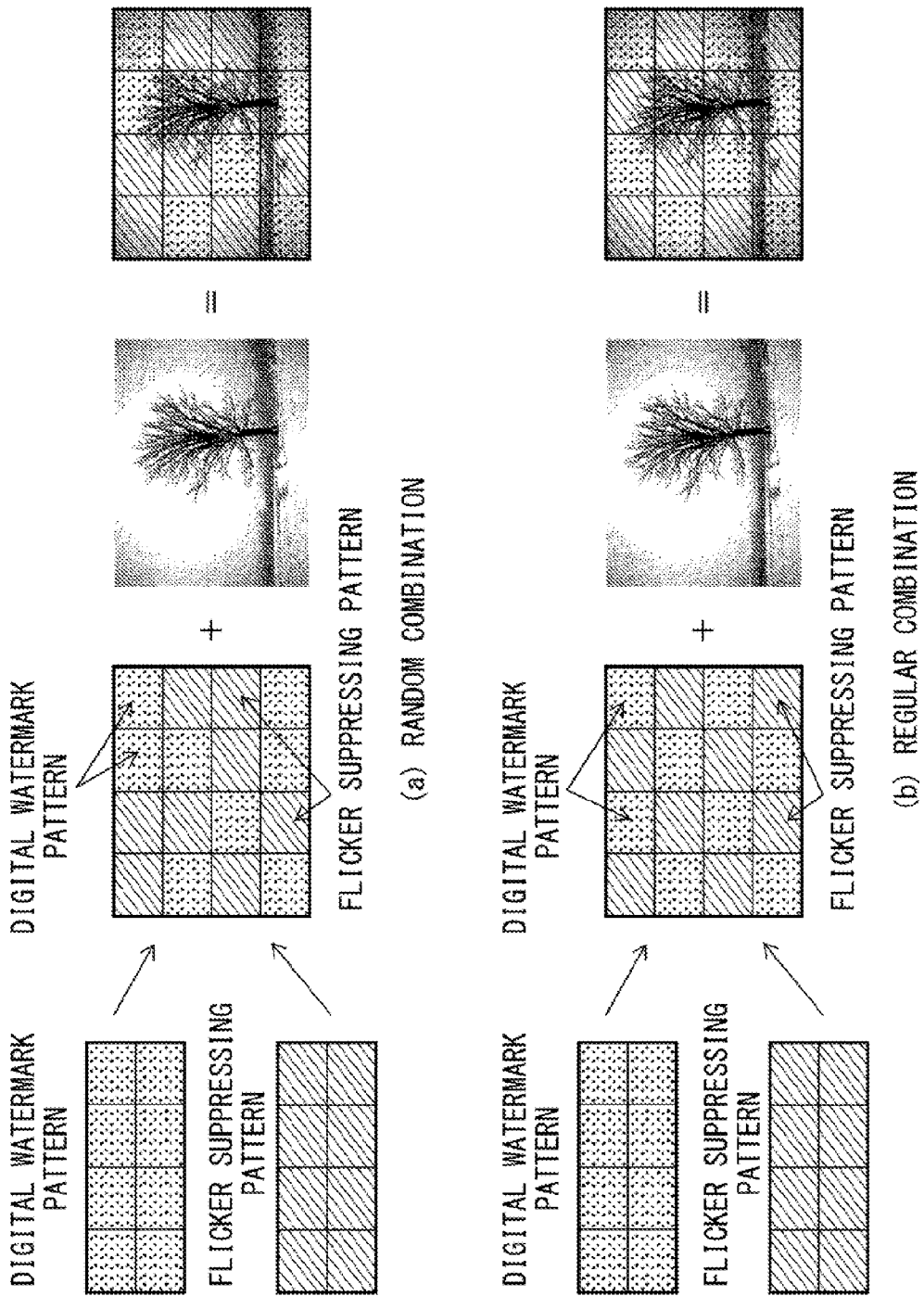
FIG. 7 is a diagram (part 1) explaining superimposing combination of a digital watermark pattern and a flicker suppressing pattern into an image.

In FIG. 7, the example (a) illustrates the way in which a combined image is obtained by dividing the digital watermark pattern and the flicker suppressing pattern is divided into a plurality of small areas, and superimposing the pattern obtained by randomly arranging the small areas of both pattern into the original image. Meanwhile, as a method of randomly arranging the small areas in this example, for example, a pseudo-random number generator is used.

Meanwhile, the example (b) illustrates the way in which a combined image is obtained by superimposing pattern obtained by regularly (in this case, a checkered pattern is used to evenly arrange both patterns) arranging the small areas of both patterns obtained in the same way as in (a) into the original images.

Meanwhile, the pattern combination unit 15 performs the superimposing combination of the image by performing α-blend defined by the following expression, in this embodiment.

$$X'=(1-\alpha)X+\alpha W$$

Meanwhile, in the expression above, X is the value of the original image before combining, and W is the value of the pixel at the same position in the pattern obtained by arranging the small areas of each of the digital watermark pattern and the flicker suppressing pattern. In addition, X' is the value of the pixel at the same position in the image after the superimposing combination.

In addition, α is the ratio of the superimposing combination, for which the value within the range from 0 to 1 is set. Here, the ratio of W increases with a larger value of α, and the resistance regarding the digital watermark mentioned earlier becomes stronger, but the degradation of the image quality of the image due to the embedding of the digital watermark also increases. On the other hand, the influence of W becomes smaller with a smaller value of α, and the resistance regarding the digital watermark mentioned earlier becomes weaker, but the degradation of the image quality of the image due to the embedding of the digital watermark decreases.

The pattern combination unit 15 performs the image combining as described above, by correcting the value of each pixel in the image area to which the digital watermark pattern or the flicker suppressing pattern is superimposed based on the value (the first value and the second value mentioned earlier) of the digital watermark pattern and the flicker suppressing pattern.

Figure 8:
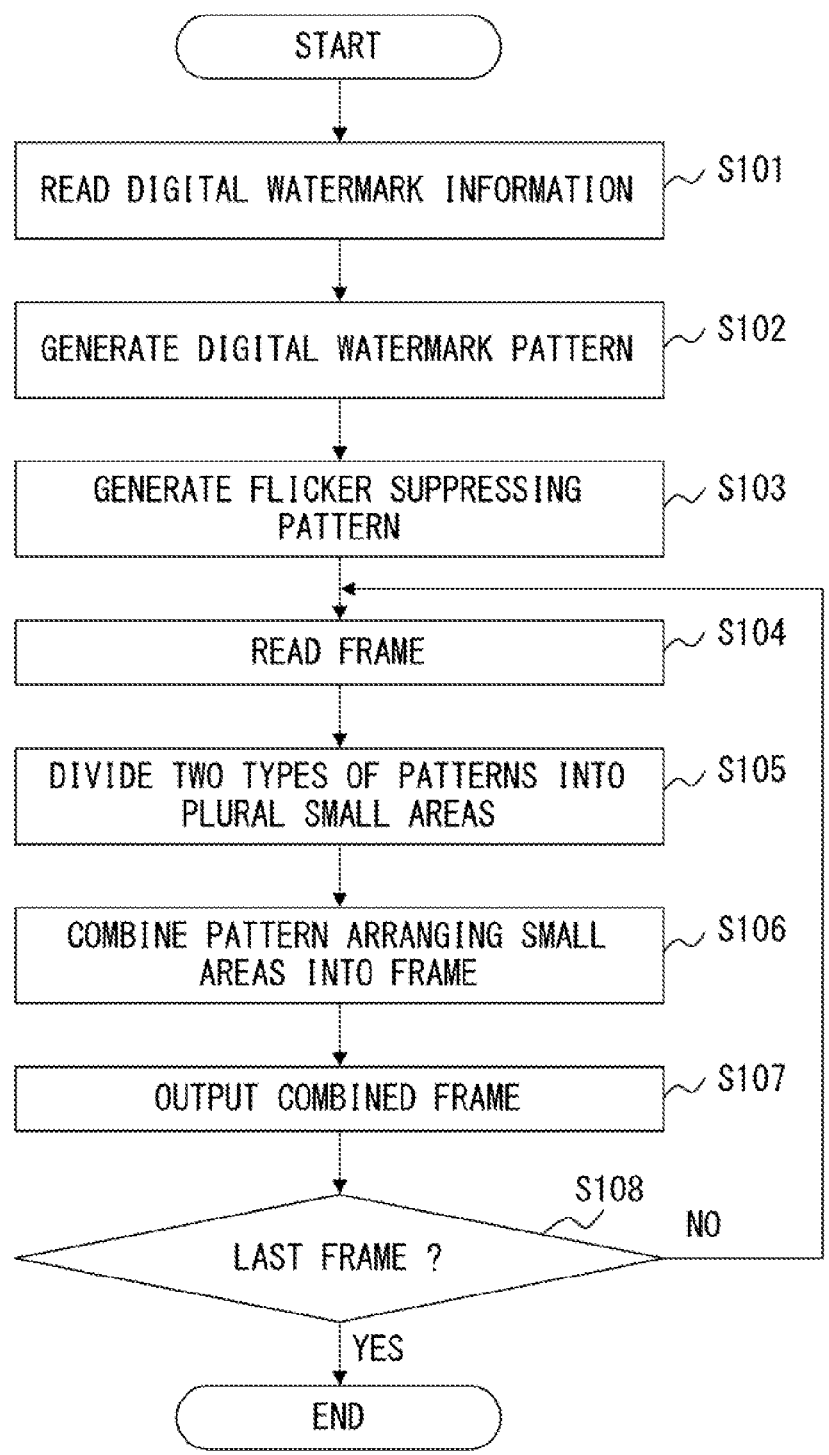
FIG. 8 is a flowchart illustrating a first example of a digital watermark embedding process.

Here, FIG. 8 is explained. FIG. 8 illustrates a first example of the digital watermark embedding process performed at the digital watermark embedding apparatus 10 in FIG. 1 in a flowchart.

When the procedure in FIG. 8 starts, first, in S101, the digital watermark information input unit 12 performs a reading process of the digital watermark information. The process is a process to obtain the digital watermark information input to digital watermark embedding apparatus 10.

Next, in S102, the digital watermark pattern generator 13 performs a digital watermark pattern generating process. The process is a process to generate the digital watermark pattern as described earlier.

Next, in S103, the flicker suppressing pattern generator 14 performs a flicker suppressing pattern generating process. The process is a process to generate a flicker suppressing pattern as described earlier, and in this example, by this process, the generation of the flicker suppressing pattern whose area changes in a constant cycle that is different from the cycle of the change of the area of the digital watermark pattern is performed.

Next, in S104, the image input unit 11 performs a frame reading process. The process is a process to obtain an image of one frame in images in time series constituting a video image, input to the digital watermark embedding apparatus 10.

Next, in S105, the pattern combination unit 15 performs a process to divide the digital watermark pattern generated by the process in S102 and the flicker suppressing pattern generated by the process in S103 into a plurality of small areas and arrange them randomly or regularly as in FIG. 7 described above.

Next, in S106, the pattern combination unit 15 performs a process to superimpose and combing the pattern arranged by the process in FIG. 15 into the image obtained by the process in S104.

Next, in S107, the pattern combination unit 15 performs a process output the image into which the digital watermark information is embedded, obtained by the combining process in S106.

Next, in S108, the image input unit 11 performs a process to judge whether or not the image of the frame obtained by the process in FIG. 14 is the last one in the images in time series constituting the video image. Here, the digital watermark embedding process is terminated when the image input unit 11 determines that the obtained image of the frame is the last one in the images in time series (when the judgment result is Yes). On the other hand, the process is brought back to S104 and the processes in and after S104 are repeated when the image input unit 11 determines that the obtained image of the frame is not the last one in the images in time series (when the judgment result is No).

The processes so far are the first example of the digital watermark embedding process.

With the digital watermark embedding apparatus 10 in FIG. 1 operating as described above, the embedding of digital watermark information into video data is performed, and also, flickers generated due to the embedding of the digital watermark information are suppressed.

Meanwhile, in the embodiment described above, the flicker suppressing pattern generator 14 generates one flicker suppressing pattern for one digital watermark pattern and superimposes it into the image. Instead of this, a plurality of types of flicker suppressing patterns whose area changes with frequency characteristics that are different from each other may be generated for one digital watermark pattern, and one of the flicker suppressing patterns may be superimposed into an image area to which no digital watermark pattern is superimposed.

Figure 9:
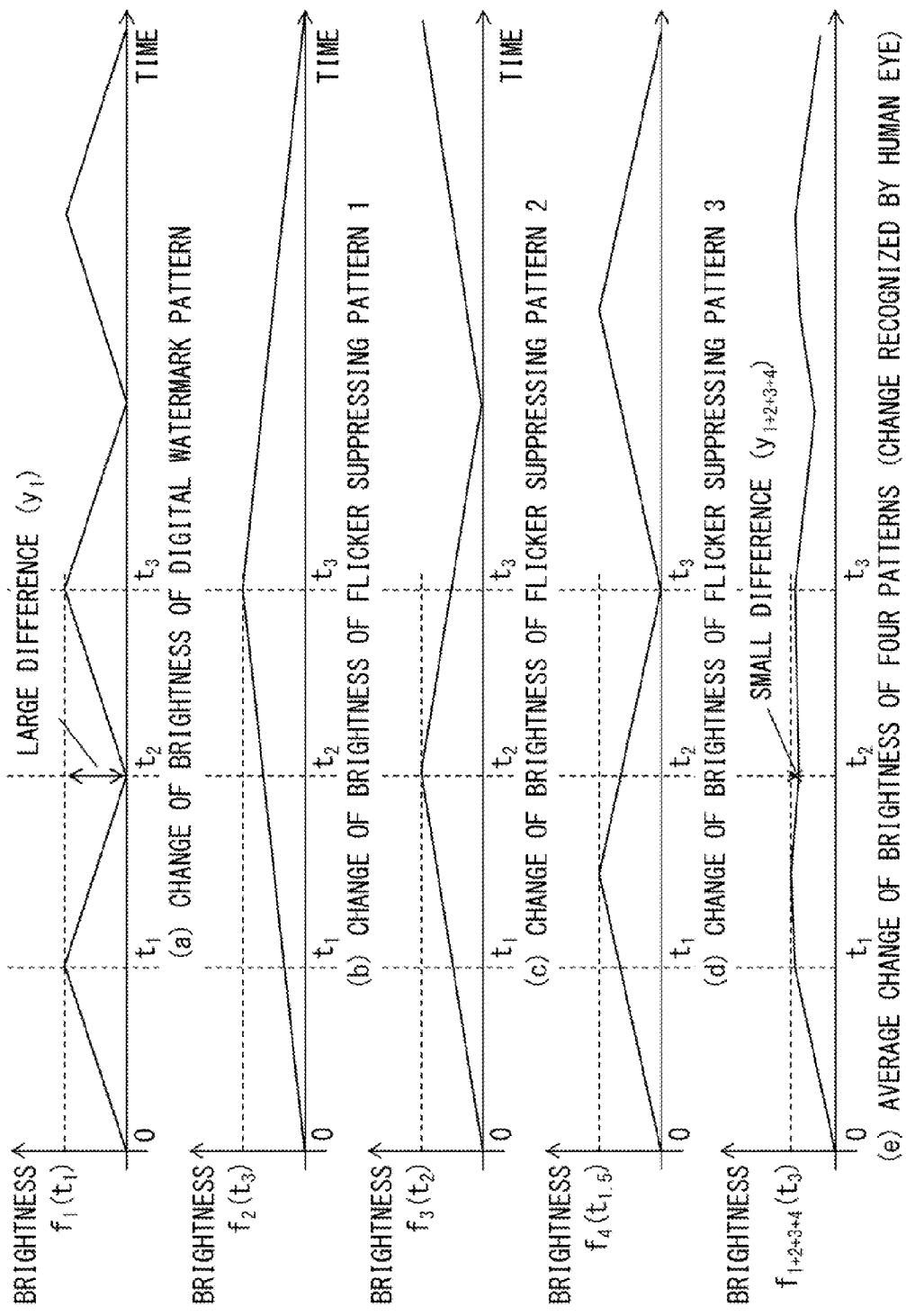
FIG. 9 is a diagram (part 4) explaining a flicker suppressing pattern.

Here, FIG. 9 is explained. FIG. 9 illustrates a case in which three types of flicker suppressing patterns are generated for one digital watermark pattern and superimposed into the image.

In each graph presented in FIG. 9, the vertical axis represents the brightness, and the horizontal axis represents the time.

In FIG. 9, the graph (a) illustrates the change of the brightness of the digital watermark pattern, in which the same graph as the graph (c) is FIG. 3 is presented for three cycles.

Meanwhile, the graphs (b), (c) and (d), respectively illustrates the change of the brightness of the slicker suppressing patterns whose cycle of the change of its area are different from each other. More specifically, these graphs are an example of a case in which the flicker suppressing pattern generator 14 generates patterns whose area changes in a cycle that is three times, twice and 1.5 times the cycle of the change of the area of the digital watermark pattern.

Then, the graph (e) is an average of the brightness presented in the respective graphs (a), (b), (c) and (d). Thus, the effect to suppress flickers may further be enhanced by superimposing and combining one digital watermark pattern and three types of flicker suppressing pattern.

Figure 10:
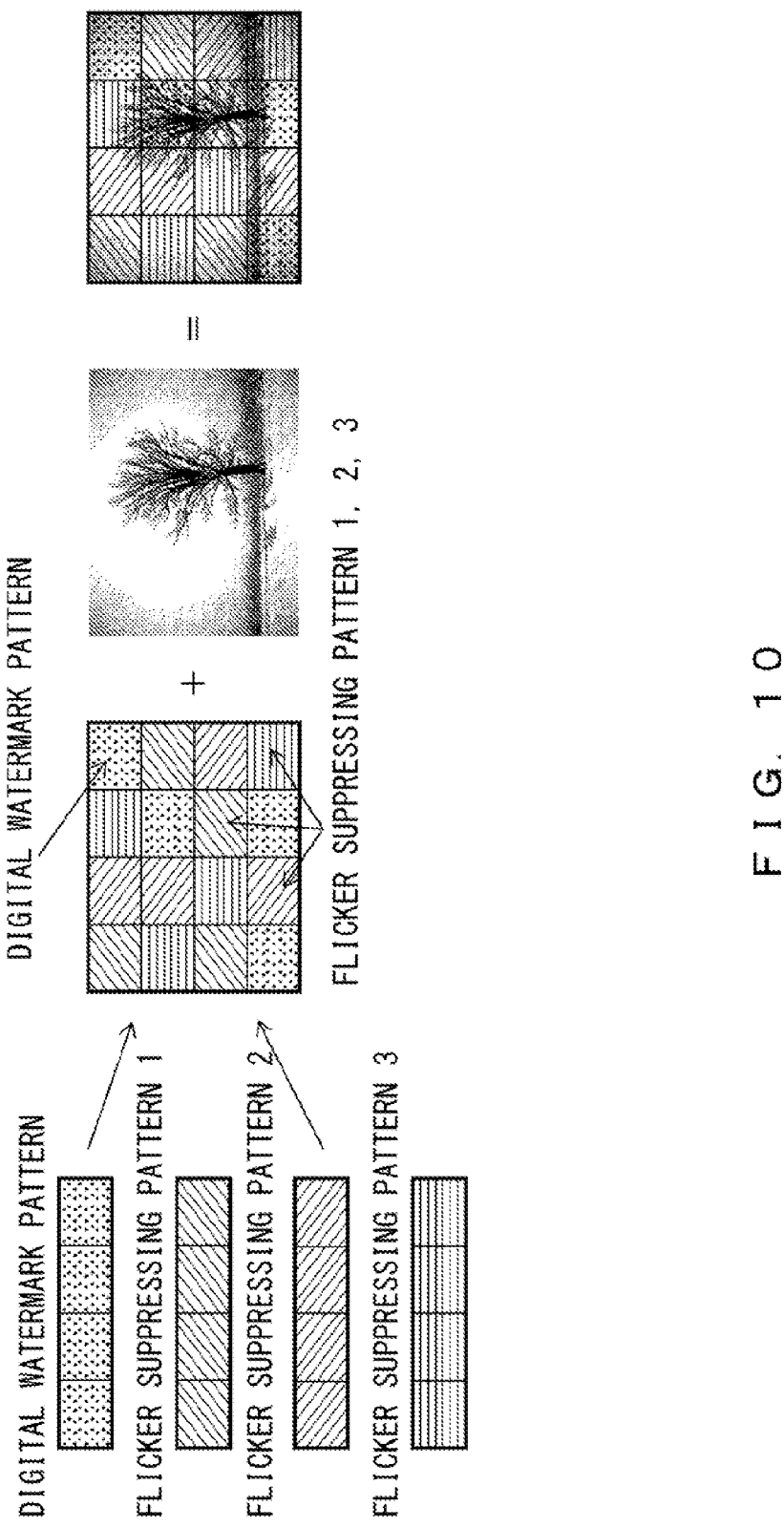
FIG. 10 is a diagram (part 2) explaining superimposing combination of a digital watermark pattern and a flicker suppressing pattern into an image.

Meanwhile, in this case, the pattern combination unit 15 performs the superimposing combination of one digital watermark pattern and a plurality of types of flicker suppressing patterns into the image as illustrated in FIG. 10 for example.

The example in FIG. 10 illustrates the way in which a combined image is obtained by dividing one digital watermark pattern and three types of flicker suppressing patterns respectively into a plurality of small images, and superimposing a pattern obtained by randomly arranging the small areas of the patterns into the original image. Meanwhile, as a method to randomly arrange the areas, in the same manner as in the example in (a) in FIG. 7, a pseudo-random number generator is used.

Meanwhile, the superimposing combination of one digital watermark pattern and a plurality of flicker suppressing pattern into the image by the digital watermark embedding process in FIG. 8 may be realized as follows.

That is, first, in the flicker suppressing pattern generating process in S103, the flicker suppressing pattern generator 14 generates these plurality of types of flicker suppressing patterns whose area changes in cycles that are different from each other, In addition, in the process in S105, the pattern combination unit 15 performs a process to divide the digital watermark pattern generated by the process in s102 and the plurality of types of flicker suppressing patterns generated by the process in 103 into a plurality of small areas and to arrange them randomly as in FIG. 10. Then, in the process in S106, the pattern combination unit 15 performs a process to superimpose and combine the pattern arranged by the process in S105 into the image obtained by the process in S104.

In addition, while the digital watermark pattern information is included only in the digital watermark pattern and embedded into the image in the embodiment described above, the digital watermark pattern information may be included also in the flicker suppressing pattern and may be embedded into the image. By doing so, even if the image area into which the digital watermark pattern is superimposed becomes small due to the superimposing of the flicker suppressing pattern, since the digital information is embedded also in the flicker suppressing pattern, the resistance mentioned earlier becomes high.

The digital watermark information may be included also in the flicker suppressing pattern at the digital watermark embedded apparatus 10 in FIG. 1 as follows, for example.

That is, the flicker suppressing pattern generator 14 generates a combination pattern whose area changes with a frequency characteristic that is different from the cycle of the change of the area of the digital watermark pattern, and generates the flicker suppressing pattern by superimposing the combination pattern and the digital watermark pattern. Then, the pattern combination unit 15 superimposes and combines the digital watermark pattern and the flicker suppressing pattern generated as described above into the image.

Figure 11:
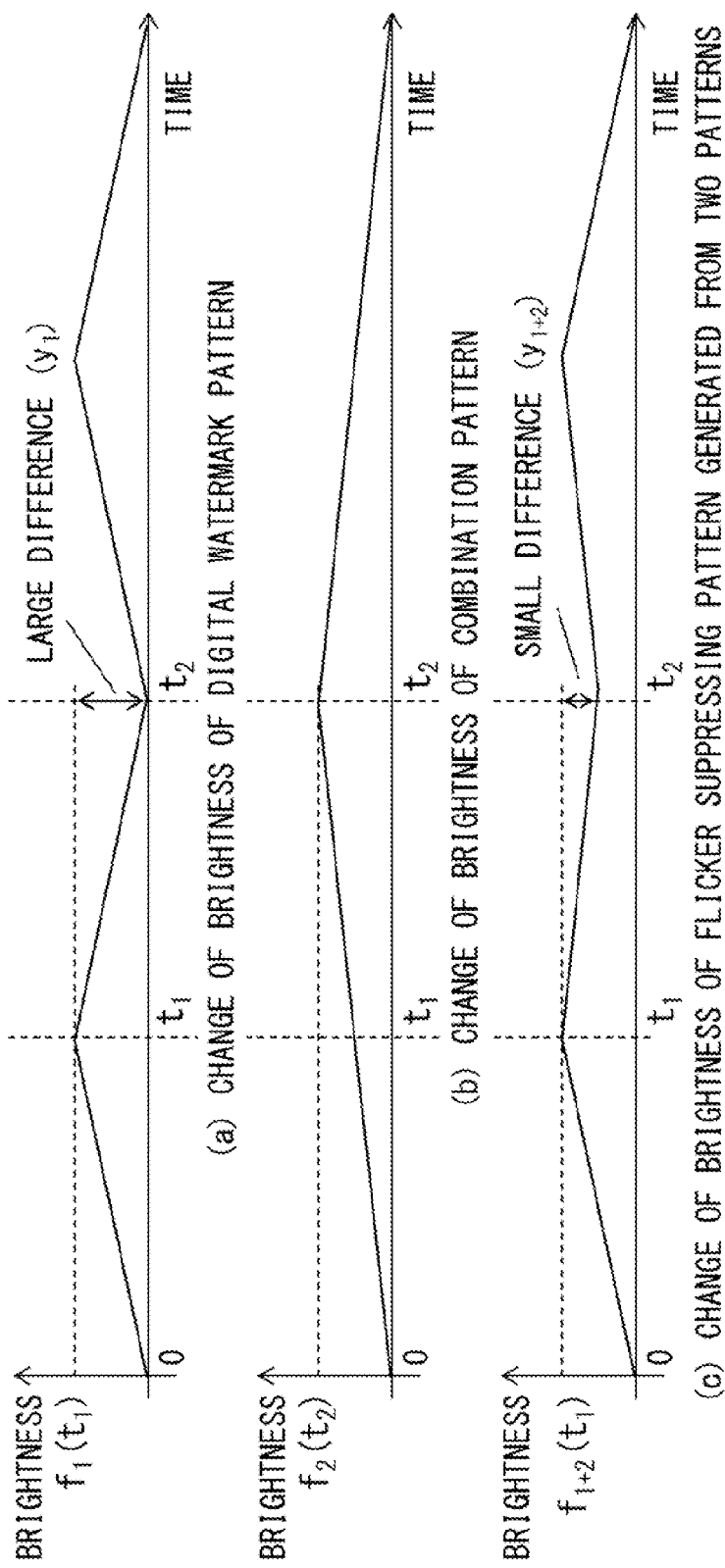
FIG. 11 is a diagram (part 5) explaining a flicker suppressing pattern.

Here, the generation of the flicker suppressing pattern by the superimposing of the combination pattern and the digital watermark pattern is explained using FIG. 11.

In each graph presented in FIG. 11, the vertical axis represents the brightness, and the horizontal axis represents the time.

In FIG. 11, the graph (a) illustrates the change of the brightness of the digital watermark pattern, and is the same graph as the graph (a) in FIG. 5.

In addition, the graph (b) illustrates the change of the brightness of the combination pattern, the graph is an example of a case in which the flicker suppressing pattern generator 14 generates a pattern whose area changes in a constant cycle (here, twice the cycle) that is different from the cycle of the change of the area of the digital watermark pattern.

Then, the graph (c) illustrates the change of the brightness of the flicker suppressing pattern generated by superimposing and combining the digital watermark pattern and the combination pattern represented by the respective graphs (a) and (b). Meanwhile, the graph is an example of a case in which the flicker suppressing pattern generator 14 averages the brightness represented by the respective graphs (a) and (b) and generates the flicker suppressing pattern. Meanwhile, instead of generating the flicker suppressing pattern, the flicker suppressing pattern generator 14 may also generate it by adding weighting to the digital watermark pattern and the combination pattern (for example, the α-blend mentioned earlier).

Here, FIG. 12 is explained. FIG. 12 illustrates the second example of the digital watermark embedding process performed at the digital watermark embedding apparatus 10 in FIG. 1 in a flowchart. The second example is for making the digital watermark embedding apparatus 10 perform the superimposing combination of the digital watermark pattern and the flicker suppressing pattern in which the digital watermark information is included into the image that is performed as described above.

In the flowchart in FIG. 12, the same numerals are assigned to the same process steps as those in the flowchart of the first example in FIG. 8, and explanation of the process details is omitted for these process steps.

In FIG. 12, following the process in S102, in S201, the flicker suppressing pattern generator 14 performs a combination pattern generating process. This process is a process to generate a pattern whose area changes with a frequency characteristic that is different from the cycle of the change of the area of the digital watermark pattern generated by the digital watermark pattern generator 13 by the process in S102, as a combination pattern.

Next, in step S202, the flicker suppressing pattern generator 14 performs a process to generate a flicker suppressing pattern from the digital watermark pattern generated by the process in S102 and the combination pattern generated by the process in S201. The process is a process to generate the flicker suppressing pattern by averaging the digital watermark pattern and a combination pattern, as described earlier.

When the process in S202 described above is finished, the process proceeds to S104, and the same processes as those in the flowchart of the first example in FIG. 8 are performed after that.

The processes so far are the second example of the digital watermark embedding process. With the digital watermark embedding apparatus 10 in FIG. 1 performing the process, the digital watermark pattern and the flicker suppressing pattern in which the digital watermark information is included are superimposed and combined into the image and output.

Meanwhile, the operation performed by the digital watermark embedding apparatus 10 in FIG. 1 may also be realized by a computer having a standard configuration.

Figure 13:
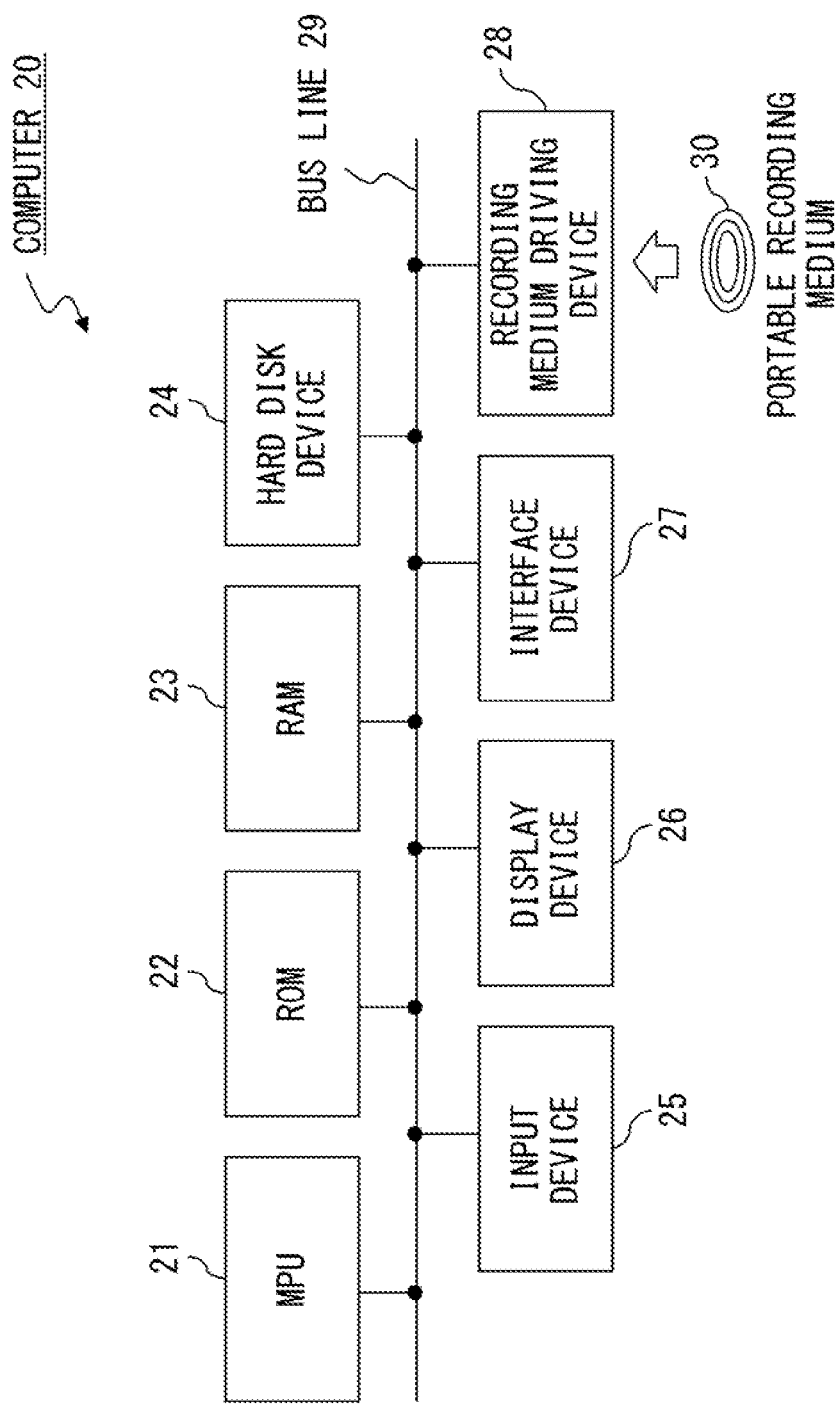
FIG. 13 is a configuration example of a computer that may be operated as a digital watermark embedding apparatus.

Here, FIG. 13 is explained. FIG. 13 illustrates a configuration example of a computer 20 that may be operated as the digital watermark embedding apparatus 10.

The computer 20 has an MPU 21, a ROM 22, a RAM 23, a hard disk device 24, an input device 25, a display device 26, an interface device 27 and a recording medium driving device 28. Meanwhile, these constituent elements are connected via a bus line 29, and may give/receive various data to/from each other under the management by the MPU 21.

The MPU (Micro Processing Unit) 21 is a processing unit that controls the operation of the computer 20 as a whole.

The ROM (Read Only Memory) 22 is a read-only semiconductor memory on which a predetermined basic control program is recoded in advance. It becomes possible for the MPU 21 to control the operation of each constituent element of the computer 20 by reading out and executing the basic control program when starting the computer 20.

The RAM (Random Access Memory) 23 is a semiconductor memory that is writable and readable any time, used as a working storage area as needed, when the MPU 21 executes various control programs.

The hard disk device 24 is a storage device to store various control programs executed by the MPU 21 and various data. It becomes possible for the MPU 21 to perform the control process described later, by reading out and executing a predetermined control program stored in the hard disc device 24.

The input device 25 is a keyboard device and a mouse device for example, and when operated by the user of the computer 20, it obtains input of various information from the user associated with the operation detail, and transmits the obtained input information to the MPU 21. For example, the input device 25 obtains digital watermark information.

The display device 26 is a liquid crystal display for example, and displays various texts and images based on display data transmitted from the MPU 21.

The interface device 27 manages the giving/receiving of various data with various devices connected to the computer 20. For example, the interface device 27 takes in video image data transmitted from other devices into the computer 20.

The recording medium driving device 28 is a device to perform reading out of various programs and data recoded on a portable recording medium 30. The MPU 21 may also be configured to perform various control processes described later, by reading out and executing a predetermined control program recorded on the portable recording medium 30 via the recording medium driving device 28. Meanwhile, the portable recording medium 30 is, for example, a CD-ROM (Compact Disc Read Only Memory), a DVD-ROM (Digital Versatile Disc Read Only Memory), a flash memory having a connecter of the USB (Universal Serial Bus) standard.

In order to make the computer 20 described above operate as the digital watermark embedding apparatus 10, first, a control program is generated for making the MPU 21 perform each process step of the digital watermark embedding process performed at the digital watermark embedding apparatus 10 illustrated in FIG. 8 or FIG. 12. The generated control program is stored in the hard disk device 24 or the portable recording medium 30 in advance. Then, a predetermined instruction is given to the MPU 21 to make it read and execute the control program. By doing so, it becomes possible for the MPU 21 to function as each unit that the digital watermark embedding apparatus 10 in FIG. 1 has, and to make the computer 20 operate as the digital watermark embedding apparatus 10.

Meanwhile, from the video image to which the digital watermark information is embedded as described above by the digital watermark embedding apparatus 10 in FIG. 1, the digital watermark information may be detected for example as follows.

First, FIG. 14 is explained. FIG. 14 is a functional block diagram of a digital watermark information detection device.

The digital watermark information detection device 40 has an average pixel value calculator 41, a frequency transformer 42 and watermark information extraction unit 43.

Upon receiving images in time series constituting a video image data to which digital watermark information is embedded, the average pixel value calculator 41 calculates the average pixel value of each image. The average luminance value represents the brightness of each image.

The frequency transformer 42 first generates a one dimensional victor vector arranging the average pixel values of each image in time-series order. Next, the frequency transformer 42 performs frequency transform of the one dimensional vector for every section corresponding to the value of one symbol, to obtain spectrum with respect to the temporal variation of the average pixel value in the section. Meanwhile, for the frequency transform, fast Fourier transform, discrete cosine transform and the like is used.

The watermark information extraction unit 43 extracts digital watermark information embedded in video image data, based on the spectrum with respect to the temporal variation of the average pixel value for each section.

As long as the picture captured in the image to which the digital watermark information is embedded is a still image, the average pixel value of each image changes along the time series, also by the picture originally captured.

Figure 15A:
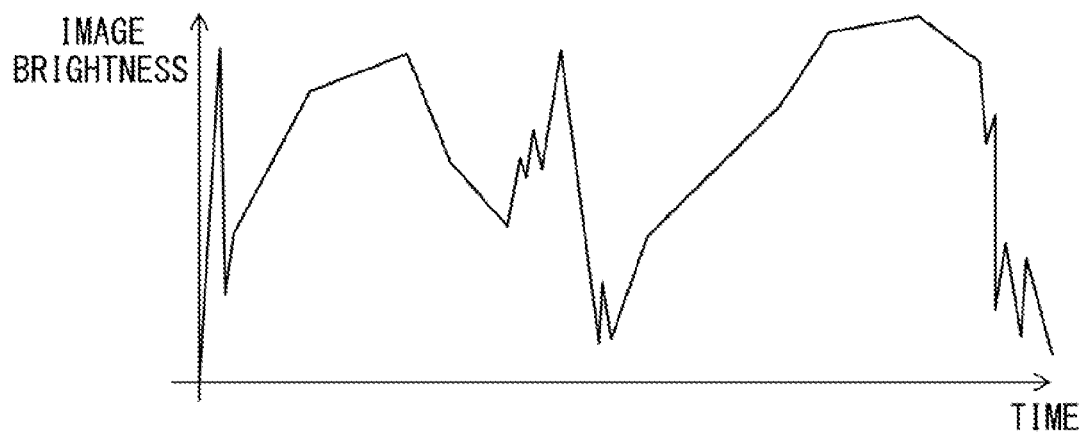
FIG. 15A is a graph representing an example of the temporal variation of the brightness of each of the images in time series constituting a video image.

Here, FIG. 15A is explained. The graph in 15A illustrates an example of the temporal variation of the brightness of each image in time series constituting a video image.

In this graph, the horizontal axis represents the time, and the vertical axis represents the brightness of the image (that is, the average luminance value) of the image.

The variation of the brightness of each image may mainly be due to the original picture of the image, rather than the change of the area of the digital watermark pattern. In such a case, as illustrated in this graph, it is originally difficult to extract the variation component of the brightness due to the change of the area of the digital watermark pattern from the temporal variation of the brightness itself.

However, the one that performed the embedding of the digital watermark pattern into the video image knows the cycle (frequency) of the change of the area of the digital watermark pattern generated by the digital watermark pattern generator 13 in the digital watermark embedding apparatus 10 in FIG. 1 in advance. Therefore, frequency transform is performed with respect to the temporal variation of the brightness (that is, the average luminance value) presented in FIG.

15A, and from the obtained frequency spectrum, the spectrum with respect to the frequency of the change of the area in the digital watermark pattern generated by the digital watermark pattern generator 13 is extracted. Then, inverse frequency transform is performed with respect to the spectrum. Then, the temporal variation of the brightness of the image due to the superimposing of the digital watermark pattern generated by the digital watermark pattern generator 13 is detected.

Figure 15B:
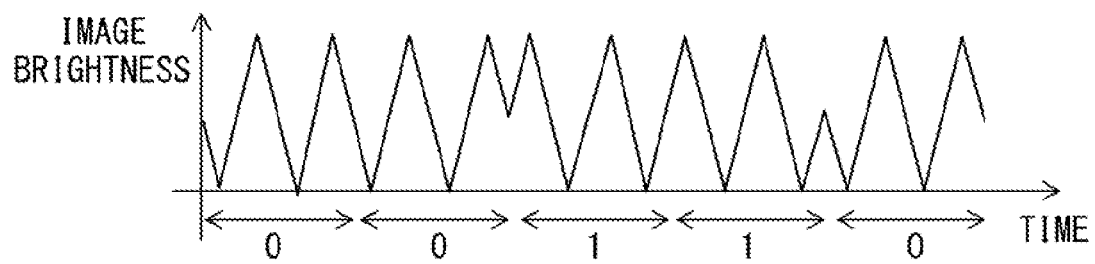
FIG. 15B is a graph representing the temporal variation of the brightness of the image due to the superimposing of a digital watermark pattern, detected from the temporal variation in FIG. 15A.

The graph in FIG. 15B illustrates the temporal variation of the brightness of the image due to the superimposing of the digital watermark pattern, detected as described above. Meanwhile, in this graph, the horizontal axis represents the time, and the vertical axis represents the brightness of the image (that is, the average luminance value).

Then, the watermark information extraction unit 43 first extracts the spectrum of the frequency corresponding to the temporal variation of the brightness of the image due to the superimposing of the digital watermark pattern, from the frequency spectrum, which is obtained by frequency transform of the temporal variation of the average pixel value in every section, output from the frequency transformer 42. Next, by performing inverse frequency transform with respect to the extracted spectrum, the temporal variation of the brightness of the image due to the superimposing of the digital watermark pattern is obtained. Then, phase information is obtained from the temporal variation, and for example, the value of the symbol corresponding to the phase is obtained by referring to a reference table representing the phase and the value of the symbol (a table representing the relationship in FIG. 4A).

With each element of the digital watermark information detecting device 40 operating as described above, it becomes possible to detect, from a video image to which digital watermark information is embedded by the digital watermark embedding apparatus 10 in FIG. 1, the digital watermark information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital watermark embedding apparatus comprising:
an image input unit which obtains input of images in time series constituting a video image;
a digital watermark information input unit which obtains input of digital watermark information;
a digital watermark pattern generator which generates a digital watermark pattern including a plurality of pixels having a predetermined first value, with an area of the digital watermark pattern changing in a constant cycle, and, a phase of cyclical change of the area changing based on a value of a symbol included in the digital watermark information;
a flicker suppressing pattern generator which generates a flicker suppressing pattern including a plurality of pixels having a predetermined second value, with an area of the flicker suppressing pattern changing with a frequency characteristic that is different from the cycle of change of the area; and
a pattern combination unit which superimposes the digital watermark pattern and the flicker suppressing pattern into each image area of the images in time series to correct a value of each pixel in an image area to which the digital watermark pattern or the flicker suppressing pattern is superimposed according to the first value and the second value.

2. The apparatus according to claim 1, wherein
the flicker suppressing pattern generator generates a pattern whose area changes in a constant cycle that is different from the cycle of change of the area of the digital watermark pattern, as the flicker suppressing pattern.

3. The apparatus according to claim 1, wherein
the pattern combination unit divides each of the digital watermark pattern and the flicker suppressing pattern into a plurality of small areas, and superimposes an arrangement of the obtained plurality of small areas into each of the images in time series.

4. The apparatus according to claim 1, wherein
the flicker suppressing pattern generator generates, as the flicker suppressing pattern, a plurality of types of patterns whose area changes with frequency characteristics that are different from each other; and
the pattern combination unit superimposes one of the plurality of types of patterns generated by the flicker suppressing pattern generator.

5. The apparatus according to claim 1, wherein
the flicker suppressing pattern generator generates a combination pattern whose area changes with a frequency characteristic that is different from the cycle of change of the area of the digital watermark pattern, and superimposes the generated combination pattern and the digital watermark pattern to generate the flicker suppressing pattern.

6. A digital watermark embedding method comprising:
generating a digital watermark pattern including a plurality of pixels having a predetermined first value, with an area of the digital watermark pattern changing in a constant cycle, and, a phase of cyclical change of the area changing based on a value of a symbol included in digital watermark information;
generating a flicker suppressing pattern including a plurality of pixels having a predetermined second value, with an area of the flicker suppressing pattern changing with a frequency characteristic that is different from the cycle of change of the area; and
superimposing the digital watermark pattern and the flicker suppressing pattern into each image area of images in time series constituting a video image to correct a value of each pixel in an image area to which the digital watermark pattern or the flicker suppressing pattern is superimposed according to the first value and the second value.

7. The method according to claim 6, wherein
in generating the flicker suppressing pattern, a pattern whose area changes in a constant cycle that is different from the cycle of change of the area of the digital watermark pattern is generated, as the flicker suppressing pattern.

8. The method according to claim 6, wherein
in superimposing the digital watermark pattern and the flicker suppressing pattern, each of the digital watermark pattern and the flicker suppressing pattern is divided into a plurality of small areas, and an arrangement of the obtained plurality of small areas is superimposed into each of the images in time series.

9. The method according to claim 6, wherein
in generating the flicker suppressing pattern, a plurality of types of patterns whose area changes with frequency characteristics that are different from each other are generated as the flicker suppressing pattern; and
in superimposing the digital watermark pattern and the flicker suppressing pattern, one of the generated plurality of types of patterns is superimposed into the image area.

10. The method according to claim 6, wherein
in generating the flicker suppressing pattern, a combination pattern whose area changes with a frequency characteristic that is different from the cycle of change of the area of the digital watermark pattern is generated, and the generated combination pattern and the digital watermark pattern are superimposed to generate the flicker suppressing pattern.

11. A computer readable non-transitory recording medium storing a program to make a computer perform embedding of a digital watermark, the program comprising:
generating a digital watermark pattern including a plurality of pixels having a predetermined first value, with an area of the digital watermark pattern changing in a constant cycle, and, a phase of cyclical change of the area changing based on a value of a symbol included in digital watermark information;
generating a flicker suppressing pattern including a plurality of pixels having a predetermined second value, with an area of the flicker suppressing pattern changing with a frequency characteristic that is different from the cycle of change of the area; and
superimposing the digital watermark pattern and the flicker suppressing pattern into each image area of images in time series constituting a video image to correct a value of each pixel in an image area to which the digital watermark pattern or the flicker suppressing pattern is superimposed according to the first value and the second value.

12. The recording medium according to claim 11, wherein
in generating the flicker suppressing pattern, a pattern whose area changes in a constant cycle that is different from the cycle of change of the area of the digital watermark pattern is generated, as the flicker suppressing pattern.

13. The recording medium according to claim 11, wherein
in superimposing the digital watermark pattern and the flicker suppressing pattern, each of the digital watermark pattern and the flicker suppressing pattern is divided into a plurality of small areas, and an arrangement of the obtained plurality of small areas is superimposed into each of the images in time series.

14. The recording medium according to claim 11, wherein
in generating the flicker suppressing pattern, a plurality of types of patterns whose area changes with frequency characteristics that are different from each other are generated as the flicker suppressing pattern; and
in superimposing the digital watermark pattern and the flicker suppressing pattern, one of the generated plurality of types of patterns is superimposed into the image area.

15. The recording medium according to claim 11, wherein
in generating the flicker suppressing pattern, a combination pattern whose area changes with a frequency characteristic that is different from the cycle of change of the area of the digital watermark pattern is generated, and the generated combination pattern and the digital watermark pattern are superimposed to generate the flicker suppressing pattern.

\* \* \* \* \*